US006992650B2

(12) United States Patent
Takei

(10) Patent No.: US 6,992,650 B2
(45) Date of Patent: Jan. 31, 2006

(54) LIQUID CRYSTAL DISPLAY APPARATUS USING HOMOGENEOUSLY ALIGNED LIQUID CRYSTAL AND DRIVE METHOD THEREFOR

(75) Inventor: Jiro Takei, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 290 days.

(21) Appl. No.: 10/253,063

(22) Filed: Sep. 24, 2002

(65) Prior Publication Data

US 2003/0098836 A1 May 29, 2003

(30) Foreign Application Priority Data

Sep. 27, 2001 (JP) .............................. 2001-298238

(51) Int. Cl.
*G09G 3/36* (2006.01)
(52) U.S. Cl. .......................... 345/89; 345/87; 345/90; 345/93
(58) Field of Classification Search ............ 345/87–97, 345/98–104
See application file for complete search history.

(56) References Cited

U.S. PATENT DOCUMENTS 6,317,111 B1 * 11/2001 Nito et al. .................... 345/88

| 6,549,256 B1 | 4/2003 | Bryan-Brown et al. |
| 2002/0036614 A1 * | 3/2002 | Nagai et al. .................. 345/95 |
| 2003/0025865 A1 * | 2/2003 | Takatori et al. ............. 349/129 |
| 2003/0058399 A1 * | 3/2003 | Miyashita .................... 349/156 |

FOREIGN PATENT DOCUMENTS

| CN | 1216122 A | 5/1999 |
| JP | 11-352450 A | 12/1999 |
| KR | 2001-0042407 A | 5/2001 |

* cited by examiner

*Primary Examiner*—Vijay Shankar
(74) *Attorney, Agent, or Firm*—Frishauf, Holtz, Goodman & Chick, P.C.

(57) ABSTRACT

A liquid crystal display apparatus comprises an active matrix type homogeneously aligned liquid crystal display device; a drive device for sequentially display the images of the monochromatic colors; and an illumination device which selectively emits lights of the plural monochromatic colors to illuminate the liquid crystal display device. The drive device applies a reset voltage and a voltage corresponding to image data to be displayed between the opposing electrodes of the liquid crystal display device, then causes the liquid crystal display device to sequentially display images of the plural monochromatic colors. The illumination device sequentially emits lights of monochromatic colors each corresponding to an image of a single color displayed by the liquid crystal display device driven by the drive device and irradiates the light on the liquid crystal display device.

16 Claims, 6 Drawing Sheets

LIQUID CRYSTAL DISPLAY APPARATUS USING HOMOGENEOUSLY ALIGNED LIQUID CRYSTAL AND DRIVE METHOD THEREFOR

BACKGROUND OF THE INVENTION

1. Field of the Invention

The present invention relates to a liquid crystal display apparatus comprising a liquid crystal display device having homogeneously aligned liquid crystal and a drive method for the liquid crystal display device.

2. Description of the Related Art

There is known a liquid crystal display device which has homogeneously aligned liquid crystal (hereinafter, a homogeneous alignment type liquid crystal display device).

The homogeneous alignment type liquid crystal display device includes: a liquid crystal cell having electrodes formed on the inner surfaces of a pair of opposing substrates, and a liquid crystal layer which is sandwiched between the pair of substrates and whose liquid crystal molecules are homogeneously aligned along one direction, and polarizers respectively arranged outside the pair of substrates. The liquid crystal display device displays images by controlling the transmittance of light by controlling the birefringence of the liquid crystal layer based on a change in the rising angle of the liquid crystal molecules.

There has been proposed a field sequential type display apparatus which divides one frame for displaying a single color image into a plurality of fields and sequentially displays a plurality of colors on the liquid crystal display device field by field to thereby display a single color image by combining displays of the individual colors of the plural fields.

The field sequential type display apparatus uses an active matrix type liquid crystal display device which uses active elements. According to the liquid crystal display device, as one frame which forms a single color image consists of three fields for respectively displaying three colors of red, green and blue, one field for displaying a single color is ⅓ of one frame, so that a data signal corresponding to a single color should be written in the liquid crystal display device and displayed in one field. The liquid crystal display device therefore requires a fast response characteristic.

Contrary to the requirement, the homogeneous alignment type liquid crystal display device has a slow response speed.

It is therefore difficult to adapt the homogeneous alignment type liquid crystal display device to a field sequential type display apparatus. Because of a slow response speed, the conventional liquid crystal display apparatus has a lower frame frequency, suffers flickering of images and has a difficulty in displaying a moving picture.

SUMMARY OF THE INVENTION

Accordingly, it is an object of the invention to provide a liquid crystal display apparatus which uses a homogeneous alignment type liquid crystal display device and has a fast response speed.

It is another object of the invention to provide a field sequential type color liquid crystal display apparatus using a homogeneous alignment type liquid crystal display device which ensures a fast response and a drive method for the liquid crystal display apparatus.

To achieve the objects, according to the first aspect of the invention, there is provided a liquid crystal display apparatus comprising a liquid crystal display device having a pair of substrates so arranged as to face each other, at least one electrode formed on each of opposing surfaces of the pair of substrates in such a way that the electrodes are opposite to each other, and a homogeneously aligned liquid crystal layer which is intervened between the opposing electrodes and whose liquid crystal molecules have long axes aligned without being twisted when an electric field is not applied between the electrodes; and a drive device which applies a voltage corresponding to image data to be displayed between the opposing electrodes of the liquid crystal display device after applying a reset voltage for causing the liquid crystal molecules to be in a predetermined alignment state between the opposing electrodes.

As the liquid crystal display apparatus according to the first aspect of the invention comprises the liquid crystal display device having a homogeneously aligned liquid crystal layer, and the drive device which applies a voltage corresponding to image data to be displayed between the opposing electrodes of the liquid crystal display device after applying a reset voltage for causing the liquid crystal molecules to be in a predetermined alignment state between the opposing electrodes, the liquid crystal molecules of the homogeneous alignment type liquid crystal display device can be allowed to behave at a high speed, so that the homogeneous alignment type liquid crystal display device can make a fast response.

It is desirable that the drive device in the liquid crystal display apparatus should have a control device which applies the reset voltage for aligning the liquid crystal molecules substantially perpendicular to the substrates between the opposing electrodes of the liquid crystal display device.

The liquid crystal display apparatus with this structure has the control device that applies the reset voltage to align the liquid crystal molecules substantially perpendicularly between the electrodes of the liquid crystal display device prior to the application of a data voltage between the electrodes, thereby aligning the liquid crystal molecules, which is in an alignment state according to the data voltage previously applied, substantially perpendicular to the substrates, and then applies a data voltage according to the image data between the electrodes, so that the liquid crystal molecules are changed to the alignment state according to the applied data voltage from the state in which the liquid crystal molecules are aligned substantially perpendicularly. This makes the force acting between the substrate surface and the liquid crystal molecules weaker in a case where the liquid crystal molecules are aligned substantially perpendicularly than in a case where the liquid crystal molecules are aligned in parallel to the substrate surface. As the liquid crystal molecules are permitted to behave within the inclination range of the liquid crystal molecules that lowers the force acting between the substrate surface and-the liquid crystal molecules, it is possible to make the response speed with respect to the application of the voltage sufficiently fast.

In case where the image data is one of pieces of data representing voltages corresponding to a plurality of gradations, it is desirable that the drive device of the liquid crystal display apparatus should have a control device which applies a highest voltage in those voltages representing the plurality of gradations corresponding to the image data, as the reset voltage, between the opposing electrodes of the liquid crystal display device. As the liquid crystal display apparatus uses the highest voltage in those voltages representing the plurality of gradations corresponding to the image data as the reset voltage, the number of supply voltages becomes smaller, so that the drive device can be made simpler.

It is preferable that the liquid crystal display device of the liquid crystal display apparatus should be a normally white type liquid crystal display device which has a pair of polarizers and transmits light when a voltage is not applied between the opposing electrodes and whose transmittance drops when a voltage is applied between the opposing electrodes, and that the drive device should have a control device which applies a voltage for causing the liquid crystal display device to display substantially black, as the reset voltage, between the opposing electrodes of the liquid crystal display device. Because this structure causes the liquid crystal display device to display black when the reset voltage is applied, unnecessary light is not transmitted by the application of the reset voltage, thus enhancing the contrast between bright display and dark display.

It is desirable that the liquid crystal display device of the liquid crystal display apparatus should have at least one retardation plate which is located between the pair of polarizers and adjusts a value of retardation of light that passes the liquid crystal display device to improve a contrast and a viewing angle characteristic. This structure can adjust the value of retardation of light that passes the liquid crystal display device by using the retardation plate, thereby making it possible to optimize the retardation of the liquid crystal display device to enhance the contrast and widen the viewing angle.

It is preferable that the liquid crystal display device of the liquid crystal display apparatus should be an active matrix liquid crystal display device which has a plurality of pixel electrodes laid out in a matrix form, active elements respectively connected to the plurality of pixel electrodes, gate lines for controlling the active elements and data lines for supplying data signals corresponding to image data to the pixel electrodes via the respective active elements, all formed on an opposing inner surface of one of the pair of opposing substrates, and has at least one opposite electrode facing the plurality of pixel electrodes, formed on an opposing inner surface of the other one of the pair of opposing substrates. As the individual pixel electrodes are driven by the active elements, the liquid crystal display device can make a fast response.

According to the second aspect of the invention, there is provided a liquid crystal display apparatus comprising a liquid crystal display device having a first substrate on which a plurality of pixel electrodes laid out in a matrix form, active elements respectively connected to the plurality of pixel electrodes, gate lines for controlling the active elements and data lines for supplying data signals corresponding to image data to be displayed to the pixel electrodes via the respective active elements are formed, a second substrate on which at least one opposite electrode is formed and which is arranged to face the first substrate in such a way that the plurality of pixel electrodes face the opposite electrode, and a homogeneously aligned liquid crystal layer which is intervened between the pixel electrodes and the opposite electrode and whose liquid crystal molecules have long axes aligned without being twisted when an electric field is not applied between the electrodes; a drive device which applies a reset voltage for aligning the liquid crystal molecules substantially perpendicular to the substrates between applies a voltage corresponding to image data to be displayed between the opposing electrodes of the liquid crystal display device, then applies a voltage corresponding to an image of one color in image data of a plurality of monochromatic colors constituting a color image to be displayed and causes the liquid crystal display device to sequentially display images of the plurality of monochromatic colors; and an illumination device which has a light source for emitting lights of the plurality of monochromatic colors constituting a color image to be displayed, sequentially emits lights of monochromatic colors each corresponding to an image of a single color displayed by the liquid crystal display device driven by the drive device according to images of colors to be displayed by the liquid crystal display device and irradiates the lights on the liquid crystal display device.

As the liquid crystal display apparatus according to the second aspect of the invention comprises the homogeneously aligned liquid crystal display device, the drive device which applies a reset voltage for aligning the liquid crystal molecules the liquid crystal molecules substantially perpendicular to the substrates between the opposing electrodes, then applies a voltage corresponding to an image of a single color in the image data of plural monochromatic colors constituting a color image to be displayed; and an illumination device which emits lights of the plurality of monochromatic colors constituting the color image to be displayed, it is possible to provide a field sequential type liquid crystal display apparatus by using the homogeneous alignment type liquid crystal display device that makes a fast response.

It is preferable that in the liquid crystal display apparatus, the drive device should have a control device which applies a highest voltage in those voltages representing a plurality of gradations corresponding to the image data, as the reset voltage, between the opposing electrodes of the liquid crystal display device. As the liquid crystal display apparatus uses the highest voltage in those voltages representing the plurality of gradations corresponding to the image data as the reset voltage, the number of supply voltages becomes smaller, so that the drive device can be made simpler.

It is preferable that the drive device should have a control device which applies the reset voltage to all of the pixel electrodes of the liquid crystal display device, then sequentially applies image data of the plurality of colors to the pixel electrodes one piece, after another. Because this structure can reset all the pixel electrodes at a time, the reset period can be shortened.

It is preferable that the illumination device should have a control device which emits a light of a monochromatic color corresponding to an image of a color to be displayed by the liquid crystal display device and irradiates the light on the liquid crystal display device after passage of a predetermined response time of the liquid crystal molecules, after the drive device has applied a voltage to the image of a single color followed by application of the reset voltage to individual pixel electrodes of the liquid crystal display device. Because light of a predetermined color is emitted from the illumination device after the response time passes after the application of the reset voltage and the illumination device is turned on after the behavior of the liquid crystal molecules in an area corresponding to the individual pixel electrodes to which the voltage corresponding to the image has been applied is completed, irregular display originated from the scanning of the matrix of pixel electrodes does not occur.

It is desirable that the liquid crystal display device should be a normally white type liquid crystal display device which has a pair of polarizers and transmits light when a voltage is not applied between the opposing electrodes and whose transmittance drops when a voltage is applied between the opposing electrodes, and that the drive device should have a control device which applies a voltage for causing the liquid crystal display device to display substantially black, as the reset voltage, between the opposing electrodes of the liquid crystal display device. As this structure causes the liquid crystal display device to display black when the reset voltage is applied, unnecessary light is not transmitted by the application of the reset voltage, thus enhancing the contrast between bright display and dark display.

It is desirable that the illumination device should have a control device which emits a light of a monochromatic color corresponding to an image of a color to be displayed by the liquid crystal display device and irradiates the light on the liquid crystal display device after passage of a predetermined response time of the liquid crystal molecules, after the drive device has applied a voltage to the image of a single color followed by application of the reset voltage to individual pixel electrodes of the liquid crystal display device. This structure prevents the liquid crystal display apparatus to show irregular display.

According to the third aspect of the invention, there is provided a method of driving a liquid crystal display apparatus comprising a liquid crystal display device having a pair of substrates so arranged as to face each other, at least one electrode laid on each of opposing surfaces of the pair of substrates in such a way that the electrodes are opposite to each other, and a homogeneously aligned liquid crystal layer which is intervened between the opposing electrodes and whose liquid crystal molecules have long axes aligned without being twisted when an electric field is not applied between the electrodes, and a drive device which drives the liquid crystal display device, the method comprising the step of allowing the drive device to apply a voltage corresponding to image data externally supplied between the opposing electrodes of the liquid crystal display device after applying a reset voltage for causing the liquid crystal molecules to be in a predetermined alignment state between the opposing electrodes.

As the display apparatus according to the third aspect of the invention drives the liquid crystal display device having a homogeneously aligned liquid crystal layer in such a way as to apply a voltage corresponding to image data to be displayed between the opposing electrodes of the liquid crystal display device after applying a reset voltage for causing the liquid crystal molecules to be in a predetermined alignment state between the opposing electrodes, the liquid crystal molecules of the homogeneously aligned liquid crystal display device can be allowed to behave at a high speed, so that the homogeneously aligned liquid crystal display device can be driven to make a fast response.

It is preferable that in this drive method, the reset voltage should be a voltage which aligns the liquid crystal molecules substantially perpendicular to the substrates. According to the drive method, the force acting between the substrate surface and the liquid crystal molecules is made weaker in a case where the liquid crystal molecules are aligned substantially perpendicularly than in a case where the liquid crystal molecules are aligned in parallel to the substrate surface. As the liquid crystal molecules are permitted to behave within the inclination range of the liquid crystal molecules that lowers the force acting between the substrate surface and the liquid crystal molecules, it is possible to make the response speed with respect to the application of the voltage sufficiently fast.

When the image data is comprised of one of voltages corresponding to a plurality of gradations, the number of supply voltages can be reduced to make the drive circuit simpler by setting the reset voltage to a highest voltage in those voltages representing the plurality of gradations corresponding to the image data.

It is preferable that in the drive method, the liquid crystal display device should be a normally white type liquid crystal display device which has a pair of polarizers and transmits light when a voltage is not applied between the opposing electrodes and whose transmittance drops when a voltage is applied between the opposing electrodes, and that the reset voltage should be a voltage for causing the liquid crystal display device to display substantially black. Because this structure causes the liquid crystal display device to display black when the reset voltage is applied, unnecessary light is not transmitted by the application of the reset voltage, thus enhancing the contrast between bright display and dark display.

In the drive method of the invention, the liquid crystal display apparatus may further comprise an illumination device which selectively and sequentially emits lights of a plurality of monochromatic colors constituting a color image to be displayed, the drive device may apply a reset voltage for aligning the liquid crystal molecules substantially perpendicular to the substrates between applies a voltage corresponding to image data to be displayed between the opposing electrodes of the liquid crystal display device, then apply a voltage corresponding to an image of one color in image data of a plurality of monochromatic colors constituting a color image to be displayed and causes the liquid crystal display device to sequentially display images of the plurality of monochromatic colors, and the illumination device sequentially may emit lights of monochromatic colors each corresponding to an image of a single color displayed by the liquid crystal display device according to images of colors to be displayed by the liquid crystal display device and irradiate the light on the liquid crystal display device.

According to the drive method, the field sequential type liquid crystal display apparatus which uses the homogeneously aligned liquid crystal display device can be driven to make a fast response.

It is desirable that in the drive method, the liquid crystal display device should be a normally white type liquid crystal display device which has a pair of polarizers and transmits light when a voltage is not applied between the opposing electrodes and whose transmittance drops when a voltage is applied between the opposing electrodes, and the reset voltage should be a voltage which causes the liquid crystal display device to display substantially black. As this structure causes the liquid crystal display device to display black when the reset voltage is applied, unnecessary light is not transmitted by the application of the reset voltage, thus enhancing the contrast between bright display and dark display.

Further, it is preferable that in the drive method, the reset voltage should be applied to all pixels of the liquid crystal display device at a time, after which image data of the plurality of colors is sequentially applied to the pixel electrodes one piece after another. Because this structure can reset all the pixel electrodes at a time, the reset period can be made shorter.

Furthermore, it is preferable that in the drive method, the illumination device should have a control device which emits a light of a monochromatic color corresponding to an image of a color to be displayed by the liquid crystal display device and irradiates the light on the liquid crystal display device after passage of a predetermined response time of the liquid crystal molecules, after the drive device has applied a voltage to the image of a single color followed by application of the reset voltage to individual pixel electrodes of the liquid crystal display device. This structure prevents the liquid crystal display apparatus to show irregular display.

DETAILED DESCRIPTION OF THE PREFERRED EMBODIMENTS

Liquid crystal display apparatuses will be described below as embodiments of the present invention with reference to the accompanying drawings.

One embodiment of the invention will be discussed blow with reference to FIGS. 1 through 8.

Figure 1:
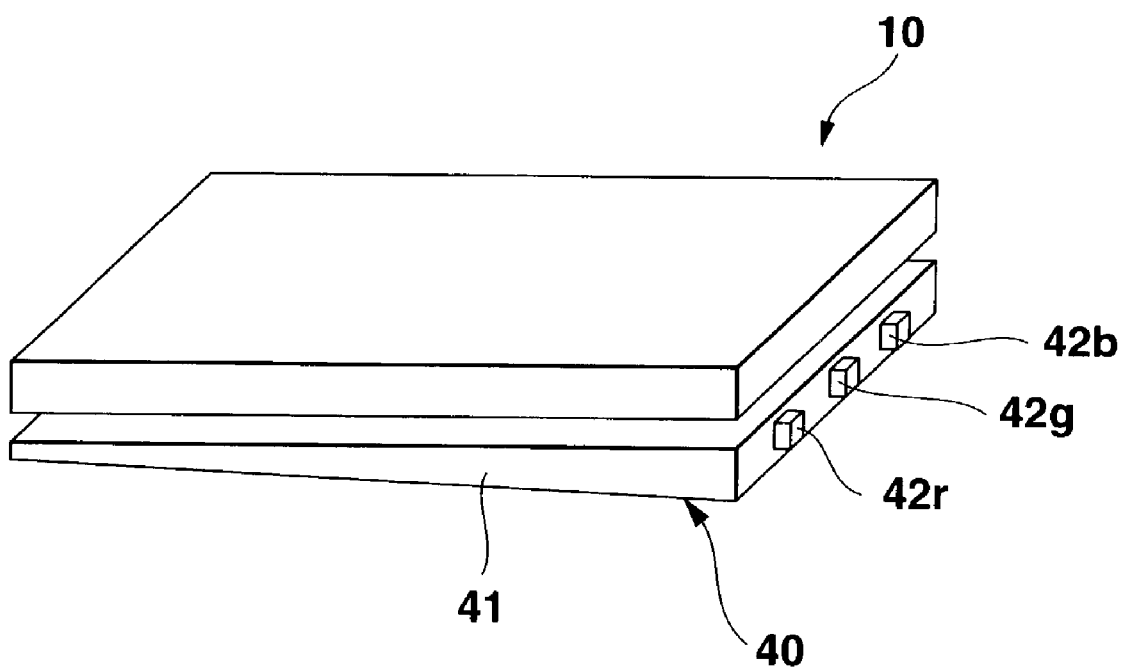
FIG. 1 is a perspective view showing the schematic structure of a field sequential type liquid crystal display apparatus according to one embodiment of the invention.

One embodiment of the invention is a field sequential type liquid crystal display apparatus which, as shown in FIG. 1, comprises an active matrix type homogeneously aligned liquid crystal display device 10 and an illumination device 40. The liquid crystal display device 10 has a plurality of pixels laid out in a matrix form and controls the light transmission of the pixels in accordance with voltages to be applied to the electrodes of the individual pixels. The illumination device 40 has a light guide plate 41 and light sources 42r, 42g and 42b which are arranged at one end of the light guide plate 41 and emit lights of colors of red R, green G and blue B. The illumination device 40 evenly guides lights from the light sources 42r, 42g and 42b of the respective colors to the entire surface of the liquid crystal display device 10 by means of the light guide plate 41 and illuminates the liquid crystal display device 10.

Figure 2:
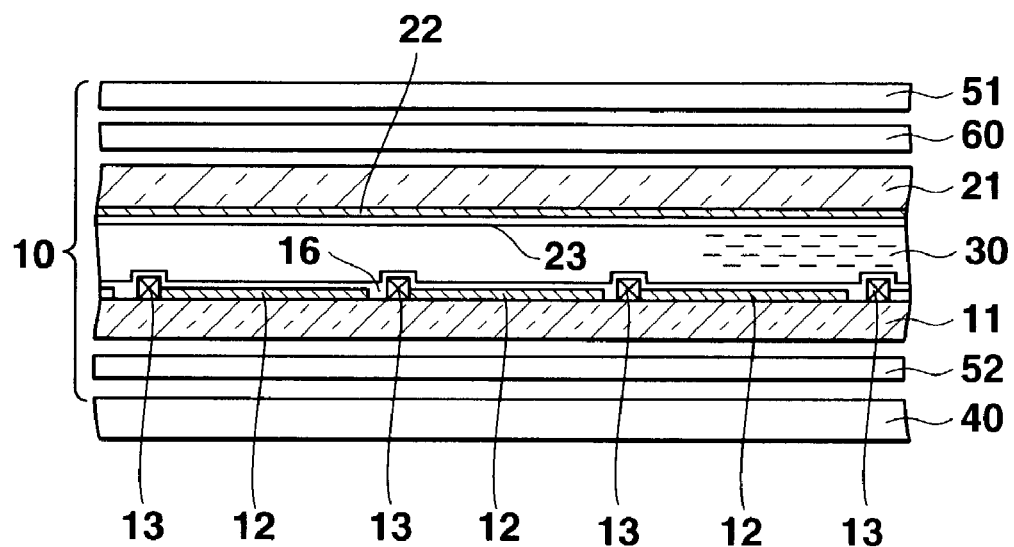
FIG. 2 is a cross-sectional view of a part of the field sequential type liquid crystal display apparatus shown in FIG. 1.
Figure 3:
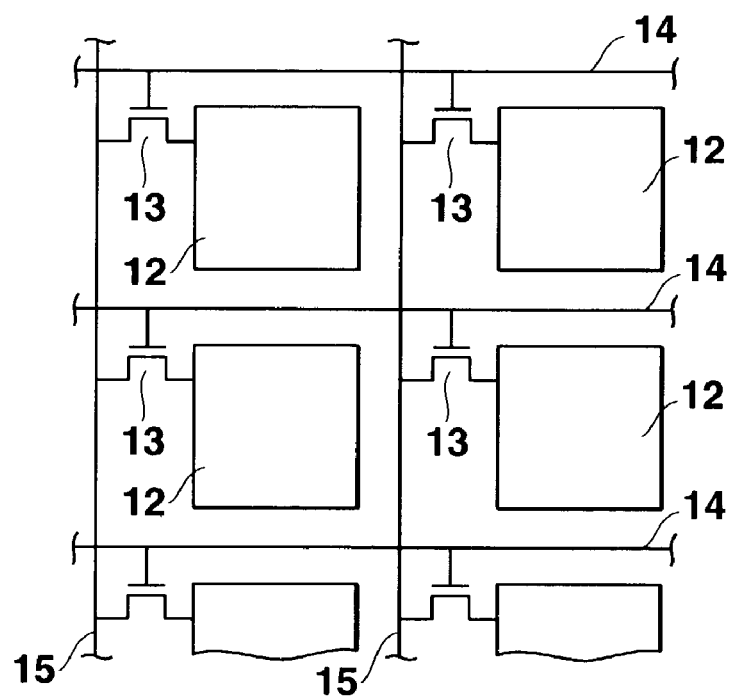
FIG. 3 is a plan view showing the schematic structures of pixel electrodes, thin film transistors, gate lines and data lines provided on one of substrates of a liquid crystal display device shown in FIG. 2.

As shown in FIGS. 2 and 3, the active matrix type homogeneously aligned liquid crystal display device 10 used in the field sequential type liquid crystal display apparatus according to this embodiment has a pair of substrates 11 and 21 facing each other, pixel electrodes 12 and an opposite electrode 22, which are so formed on the respective inner surfaces of the pair of substrates 11 and 21 as to face each other, and a liquid crystal layer 30 which is sealed between the pair of substrates and whose liquid crystal molecules have their long axes homogeneously aligned along one direction without twisting the aligned state of the liquid crystal molecules.

Polarizers 51 and 52 are respectively arranged outside the pair of substrates 11 and 21. A retardation plate 60 is placed between one of the pair of substrates 11 and 21 and the polarizer located outside that substrate, e.g., between the front substrate 21 which is on the light output side (the display viewing side) and the polarizer 51.

The liquid crystal display device 10 is of an active matrix type which has TFTs (Thin Film Transistors) 13 as active elements. As shown in FIGS. 2 and 3, the plurality of pixel electrodes 12 arrayed in the matrix of rows and columns, the TFTs 13 respectively connected to the pixel electrodes 12, a plurality of gate lines 14 which supply gate signals to the respective rows of TFTs 13 and a plurality of data lines 15 which supply data signals to the respective columns of TFTs 13 are provided on the inner surface of one of the pair of substrates 11 and 21, e.g., the inner surface of the back substrate 11 which is on the light input side. At least one opposite electrode 22 is provided on the inner surface of the other substrate, e.g., the inner surface of the front substrate 21 which is on the light output side.

Each TFT 13, which is illustrated in a simplified form in FIG. 2, is a thin film transistor using an amorphous silicon thin film or a thin film transistor using a polysilicon thin film. In case of the thin film transistor using an amorphous silicon thin film, the TFT 13 comprises a gate electrode formed on the back substrate 11, a transparent gate insulating film formed on approximately the entire back substrate 11, an i type semiconductor film formed, opposite to the gate electrode, on the gate insulating film and a source electrode and a drain electrode, which are formed on the respective sides of the i type semiconductor film via n type semiconductor films.

Although the gate lines 14 and the data lines 15 are not shown in FIG. 2, the gate lines 14 are formed integral with the gate electrodes of the TFTs 13 and the data lines 15 are formed on the gate insulating film and connected to the drain electrodes of the TFTs 13. The pixel electrodes 12 are formed on the gate insulating film and connected to the source electrodes of the TFTs 13.

Homogeneous alignment films 16 and 23 are respectively provided on those surfaces of the pair of substrates 11 and 21 which contact the liquid crystal layer 30. The alignment films 16 and 23 are aligned approximately in parallel to each other and in the opposite directions.

The pair of substrates 11 and 21 are connected together at their peripheral portions via an unillustrated frame-shaped seal member, and a nematic liquid crystal having a positive dielectric anisotropy is filled in the area between the substrates 11 and 21 that is surrounded by the seal member in such a way that its liquid crystal molecules are homogeneously aligned, without being twisted, in the alignment directions of the alignment films 16 and 23 while being tilted at a plurality of pretilt angle of 2° to 3° with respect to the surfaces of the substrates 11 and 21 (the surfaces of the alignment films 16 and 23).

One of the front and back polarizers 51 and 52 located outside the pair of substrates 11 and 21 is arranged in such a way that its transmission axis is set in the direction of about 45° with respect to the homogeneous alignment direction of the liquid crystal molecules (the alignment directions of the alignment films 16 and 23) and the transmission axes of the polarizers 51 and 52 are set approximately perpendicular to each other.

The retardation plate 60 is provided to enhance the display contrast and widen the viewing angle and its retardation delay axis is set approximately perpendicular to the homogeneous alignment direction of the liquid crystal molecules.

Figure 4:
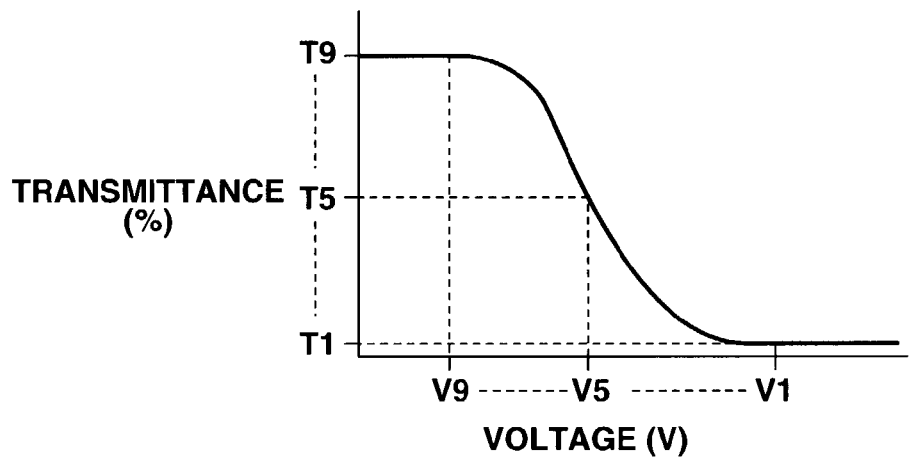
FIG. 4 is a diagram of the voltage vs. transmittance characteristic of a homogeneous alignment type liquid crystal display device.

FIG. 4 shows the voltage vs. transmittance characteristic of the homogeneous alignment type liquid crystal display device 10. This characteristic shows the transmittance in case where the homogeneous alignment type liquid crystal display device 10 in normally white mode which has a liquid crystal layer thickness d set to 1.5 μm and Δnd (the product of the refractive index anisotropy Δn and the liquid crystal layer thickness d) set to 300 nm and whose retardation plate 60 has a retardation set to 25 nm is used and data voltages V1 to V9 for nine gradations for controlling the transmittance to nine gradations T1 to T9 are applied between the pixel electrodes 12 and the opposite electrode 22 of the liquid crystal display device 10.

Of the data voltages V1 to V9 for nine gradations, the lowest voltage V9 has a value to homogeneously align the liquid crystal molecules at the initial pretilt angle with respect to the surfaces of the substrates 11 and 21 and the highest voltage V1 has a value to align the liquid crystal molecules substantially perpendicular to the surfaces of the substrates 11 and 21.

Figure 5:
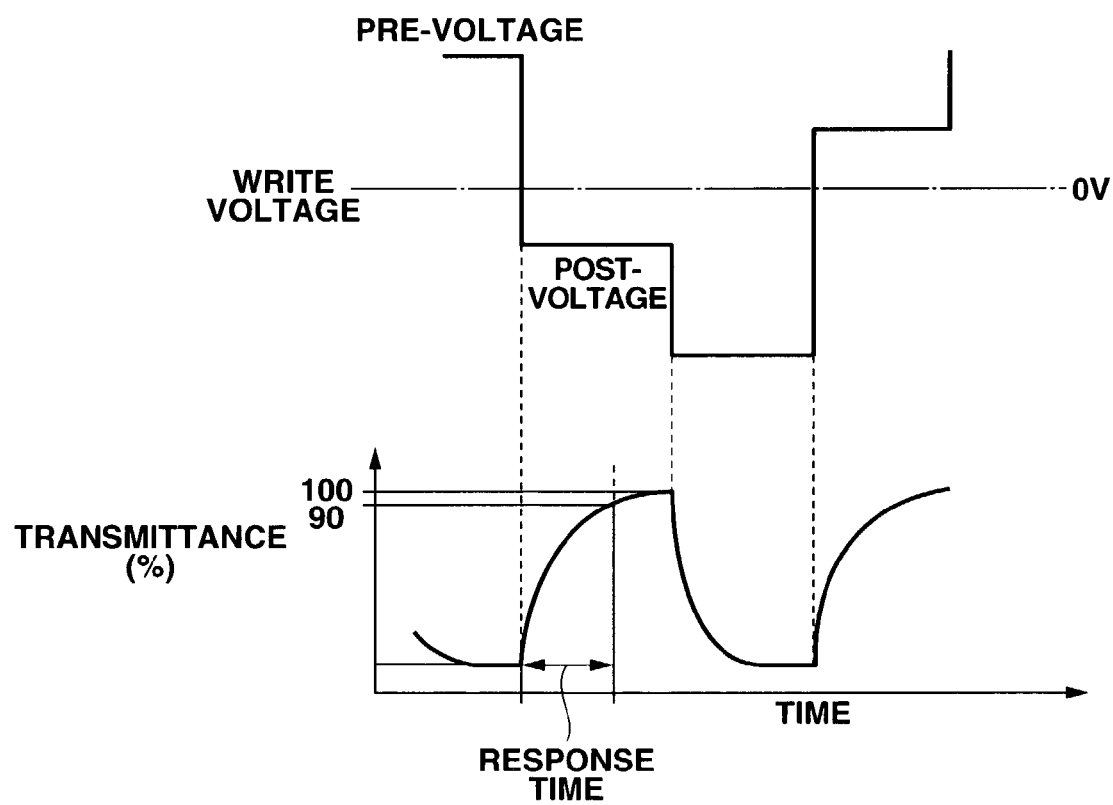
FIG. 5 is a diagram showing a change in the waveform of a data voltage to be applied between the electrodes of the homogeneous alignment type liquid crystal display device and a change in transmittance.

Table 1 shows the response times among the individual gradations when one of the data voltages V1 to V9 for nine gradations is applied between the pixel electrodes 12 and the opposite electrode 22 of the homogeneous alignment type liquid crystal display device 10 in normally white mode, then another one of the data voltages V1 to V9 for nine gradations is applied between the pixel electrodes 12 and the opposite electrode 22, as shown in the waveforms of the data voltages in FIG. 5. In FIG. 5 and Table 1, pre-voltages V1 to V9 are voltages applied previously and post-voltages V1 to V9 are voltages applied later. The response times among the gradations in Table 1 are times from the point at which application of the data voltage has started to the point at which the transmittance becomes 90% in the chart in FIG. 5 showing a change in transmittance with the transmittance corresponding to the data voltage being 100%.

TABLE 1

|  |  | high ←—— post-voltage ——→ low | | | | | | | | |
|---|---|------|------|------|------|------|------|------|------|------|
|  |  | V1 | V2 | V3 | V4 | V5 | V6 | V7 | V8 | V9 |
| high | V1 |  | 1.36 | 1.49 | 2.05 | 2.39 | 2.82 | 3.06 | 3.55 | 2.83 |
| ↑ | V2 | 0.49 |  | 1.75 | 2.07 | 2.36 | 2.72 | 3.13 | 3.58 | 2.81 |
|  | V3 | 0.48 | 1.02 |  | 2.59 | 2.64 | 2.95 | 3.38 | 3.83 | 2.47 |
|  | V4 | 0.48 | 1.08 | 1.37 |  | 3.75 | 3.32 | 3.70 | 4.08 | 3.04 |
| pre-voltage | V5 | 0.48 | 1.08 | 1.45 | 1.55 |  | 4.67 | 4.48 | 4.64 | 3.28 |
|  | V6 | 0.50 | 1.12 | 1.63 | 1.88 | 1.78 |  | 8.46 | 5.39 | 3.52 |
| ↓ | V7 | 0.49 | 1.31 | 1.79 | 2.19 | 2.45 | 2.48 |  | 7.47 | 3.95 |
| low | V8 | 0.55 | 1.44 | 2.00 | 2.45 | 2.94 | 3.47 | 3.62 |  | 4.59 |
|  | V9 | 0.88 | 2.20 | 2.99 | 4.05 | 5.09 | 6.33 | 7.83 | 9.90 |  |

(unit: msec)

As shown in Table 1, the response time between the individual gradations of the homogeneous alignment type liquid crystal display device 10 is, for example, 0.48 msec when the pre-voltage is V5 and the post-voltage is V1 and is 4.67 msec when the pre-voltage is V5 and the post-voltage is V6. The longest response time in the response times among the gradations is 9.90 msec that is in a case where the pre-voltage is V9 and the post-voltage is V8.

As apparent from the above, the response time of the homogeneous alignment type liquid crystal display device 10 is short when a data voltage in a high voltage range is applied and the response speed is thus fast, whereas the response time is long when a data voltage is changed in a low voltage range and the response speed is thus slow. Further, the response speed of the homogeneous alignment type liquid crystal display device 10 is fast when a data voltage with a low voltage value is applied after application of a data voltage with a high voltage value, whereas the response speed is slow when a data voltage with a high voltage value is applied after application of a data voltage with a low voltage value.

This is because the interacting force of the alignment films 16 and 23 and the liquid crystal molecules (the force to homogeneously align the liquid crystal molecules) and the force to align the liquid crystal molecules upright by an electric field, the opposite forces, act on the liquid crystal molecules. When a voltage in a range of high voltage values is applied, the liquid crystal molecules behave tilted at a large angle with respect to the surface of the alignment film. This makes the interacting force relatively weaker than the force to cause the upright alignment, so that the liquid crystal molecules are easier to move in accordance with the applied voltage, thus ensuring a fast response speed. When a voltage is changed in a range of low voltage values, on the other hand, the angle of the liquid crystal molecules with respect to the surface of the alignment film is small and the liquid crystal molecules behave in a tilt range of a nearly parallel angle. This makes the interacting force relatively stronger than the force to cause the upright alignment, so that the response speed becomes slower.

Based on the above knowledge, in this embodiment, the homogeneous alignment type liquid crystal display device 10 is driven in such a way that after the reset voltage to align the liquid crystal molecules in a predetermined alignment state is applied between the pixel electrodes 12 and the opposite electrode 22 of the liquid crystal display device 10, a data voltage corresponding to image data is applied between those electrodes. It is preferable that the reset voltage should be a voltage to align the liquid crystal molecules substantially perpendicular to the substrates or a data voltage having the highest voltage value in a plurality of data voltages representing a plurality of gradations. It is further preferable that the reset voltage should be a data voltage to display black when the liquid crystal display device is of a normally white type.

In this embodiment, as the reset voltage to align the liquid crystal molecules substantially perpendicular to the substrates 11 and 21 is applied between the pixel electrodes 12 and the opposite electrode 22 of the homogeneous alignment type liquid crystal display device 10 and then a data voltage corresponding to image data is applied between those electrodes 12 and 22, the homogeneous alignment type liquid crystal display device 10 can be allowed to respond at a high speed with respect to the applied voltage and the liquid crystal display apparatus equipped with this homogeneous alignment type liquid crystal display device 10 can be driven at a high frame frequency.

In other words, in this embodiment, as the reset voltage is applied between the pixel electrodes 12 and the opposite electrode 22 of the homogeneous alignment type liquid crystal display device 10 prior to the application of a data voltage between those electrodes 12 and 22, the liquid crystal molecules, which is in an alignment state according to the data voltage previously applied, is aligned approximately perpendicular to the surfaces of the substrates 11 and 21 to reset the previous written state, after which a data voltage according to the image data is applied between the pixel electrodes 12 and the opposite electrode 22, so that the liquid crystal molecules are changed to the alignment state according to the data voltage applied after the application of the reset voltage from the state in which the liquid crystal molecules are aligned approximately perpendicularly. Accordingly, the liquid crystal molecules mainly behave in a state where the liquid crystal molecules are tilted at a large angle to the surfaces of the alignment films 16 and 23 or in a rage where the interacting force of the alignment films 16 and 23 and the liquid crystal molecules is weak. This can make the response speed sufficiently fast at the time of changing the data voltage in a low-voltage range.

According to this drive method, a data voltage corresponding to image data is applied between those electrodes 12 and 22 of the liquid crystal display device 10 after the application of the reset voltage between those electrodes 12 and 22. As the reset voltage is a high voltage which aligns the liquid crystal molecules approximately perpendicular to the surfaces of the substrates 11 and 21 and its value is high, the response speed is very fast so that the application time of the reset voltage can be short.

The drive method can therefore drive the liquid crystal display apparatus equipped with the homogeneous alignment type liquid crystal display device 10 at a high speed.

In the drive method, it is preferable that the reset voltage should have the same value as the highest data voltage in the data voltages that correspond to image data, e.g., the highest data voltage VI in the data voltages V1 to V9 for nine gradations. This design can provide the reset voltage by sing existing data voltage generating means without newly providing reset voltage generating means.

The response time to a data voltage when the reset voltage having the same value as the highest data voltage V1 is applied between the pixel electrodes 12 and the opposite electrode 22 of the homogeneous alignment type liquid crystal display device 10, followed by application of the data voltage, is the same as the response time when the pre-voltage in Table 1 is V1 and the longest response time is 3.55 msec achieved when the data voltage V8 is applied. The application time of the data voltage to the pixel electrodes 12 constituting each row of pixels of the liquid crystal display device 10 and the opposite electrode 22 has only to be set equal to or greater than 3.55 msec.

The response time to the reset voltage when the reset voltage is set to have the same value as the highest data voltage V1 is the same as the response time when the post-voltage in Table 1 is V1 and the longest response time is 0.88 msec achieved when the pre-voltage is V9. The application time of the data voltage to the pixel electrodes 12 of each row of pixels of the liquid crystal display device 10 and the opposite electrode 22 has only to be set equal to or greater than 0.88 msec.

While the reset voltage may be applied every selection period for each row of pixels, it is preferable to provide a reset period to reset the written states of all the rows of pixels at a time in addition to the selection period for each row of pixels and to apply the reset voltage between the pixel electrodes 12 of all the rows of pixels and the opposite electrode 22 in that reset period.

That is, in case where the reset voltage is applied every selection period for each row of pixels, the selection period for each row of pixels has only to be set equal to or greater than the sum of the longest response time to the reset voltage (0.88 msec) and the longest response time to the data voltage (4.43 msec).

The selection period for each row of pixels in this case is equal to or smaller than ½ of the selection period according to the conventional drive method (9.90 msec or longer), so that the liquid crystal display apparatus can respond at a faster speed than that of the conventional drive method and can be driven at a high frame frequency by shortening the time for one frame.

In case where the reset voltage to align the liquid crystal molecules approximately perpendicular to the surfaces of the substrates 11 and 21 is applied between the pixel electrodes 12 of all the rows of pixels and the opposite electrode 22 at a time and then data voltages corresponding to image data are applied between the pixel electrodes 12 of all the rows of pixels and the opposite electrode 22 one after another, on the other hand, the selection period for each row of pixels has only to be set equal to or greater than the longest response time to the data voltage (3.55 msec) and a collective reset period equal to or greater than the longest response time to the reset voltage (0.88 msec) has only to be secured in addition to the selection period for each row of pixels. This case can make the time for one frame shorter than the case where the reset voltage is applied for each selection period for each row of pixels, so that the liquid crystal display apparatus can be driven at a high frame frequency.

In the latter case, before the selection period for the row of pixels to be selected first in the individual rows of pixels of the liquid crystal display device 10, the gate signals should be simultaneously supplied to all the gate lines 14 and the reset signals should be supplied to all the data lines 15 to reset the written states of all the rows of pixels at a time, after which the gate signals should be supplied to the individual gate lines 14 one atter another and the data signals should be supplied to the individual data lines 15 in synchronism with the supply of the gate signals to sequentially select each row of pixels and sequentially write data in the pixels.

Figure 6:
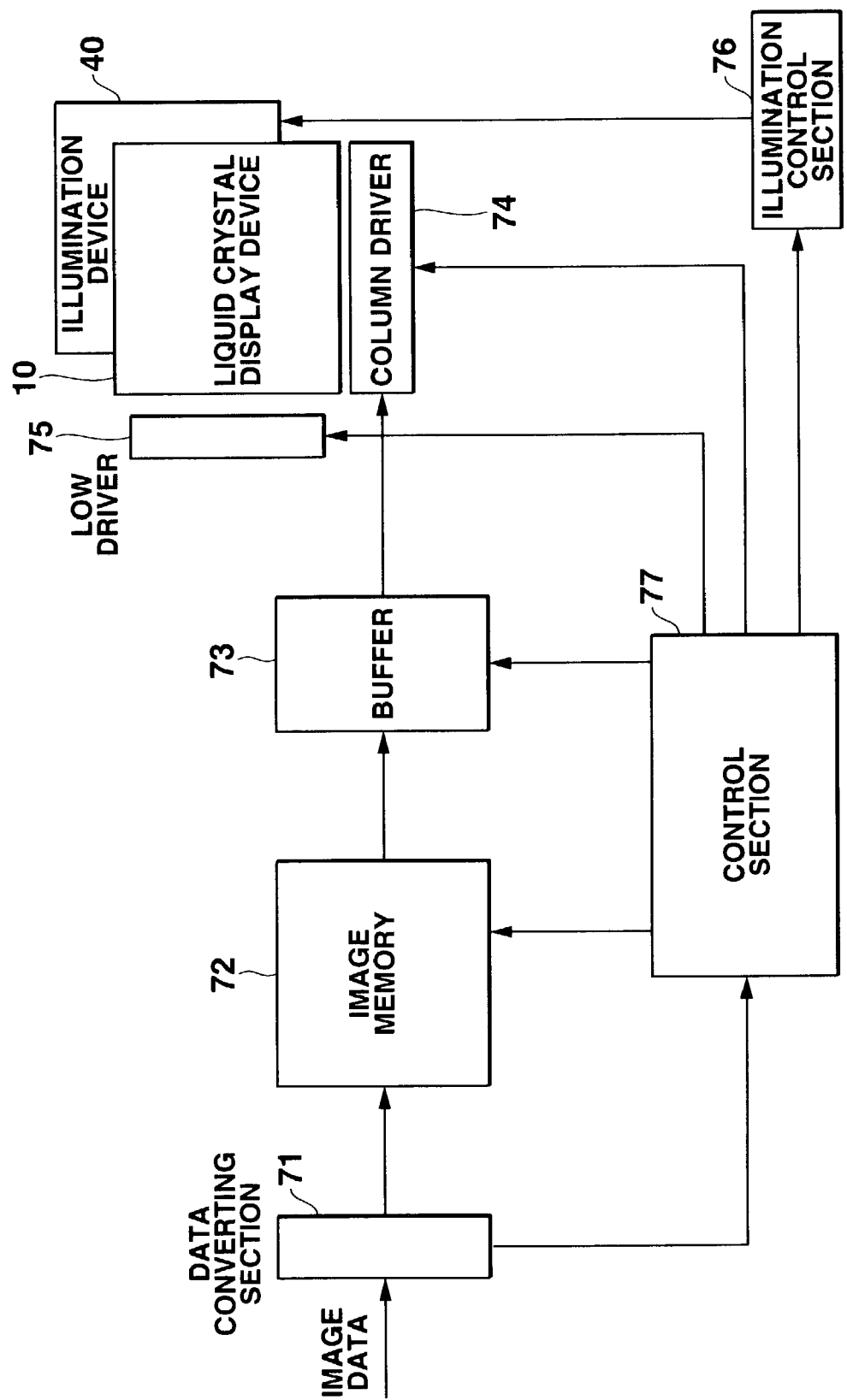
FIG. 6 is a block diagram showing a drive circuit in the field sequential type liquid crystal display apparatus according to this embodiment.

The field sequential type liquid crystal display apparatus is driven by a drive circuit shown in FIG. 6. The drive circuit comprises a data converting section 71, an image memory 72, a buffer 73, a column driver 74, a row driver 75, an illumination control section 76 and a control section 77. The data converting section 71 converts externally supplied image data to R, G and B image data of individual colors of red, green and blue and control signals. The image memory 72 stores the converted R, G and B image data. The R, G and B image data read from the image memory 72 are supplied to the buffer 73 which outputs the R, G and B image data as serial image data. The column driver 74 receives the R, G and B image data output from the buffer 73 and supplies data signals corresponding to individual pieces of image data to the respective data lines 15 of the liquid crystal display device 10. The row driver 75 supplies the gate signals to the individual gate lines 14 of the liquid crystal display device 10 to sequentially scan the gate lines 14. The illumination control section 76 drives the illumination device 40. The control section 77 controls the writing and reading of the image memory 72 and the operations of the buffer 73, the column driver 74, the row driver 75 and the illumination control section 76 based on the control signals supplied from the data converting section 71.

Figure 7:
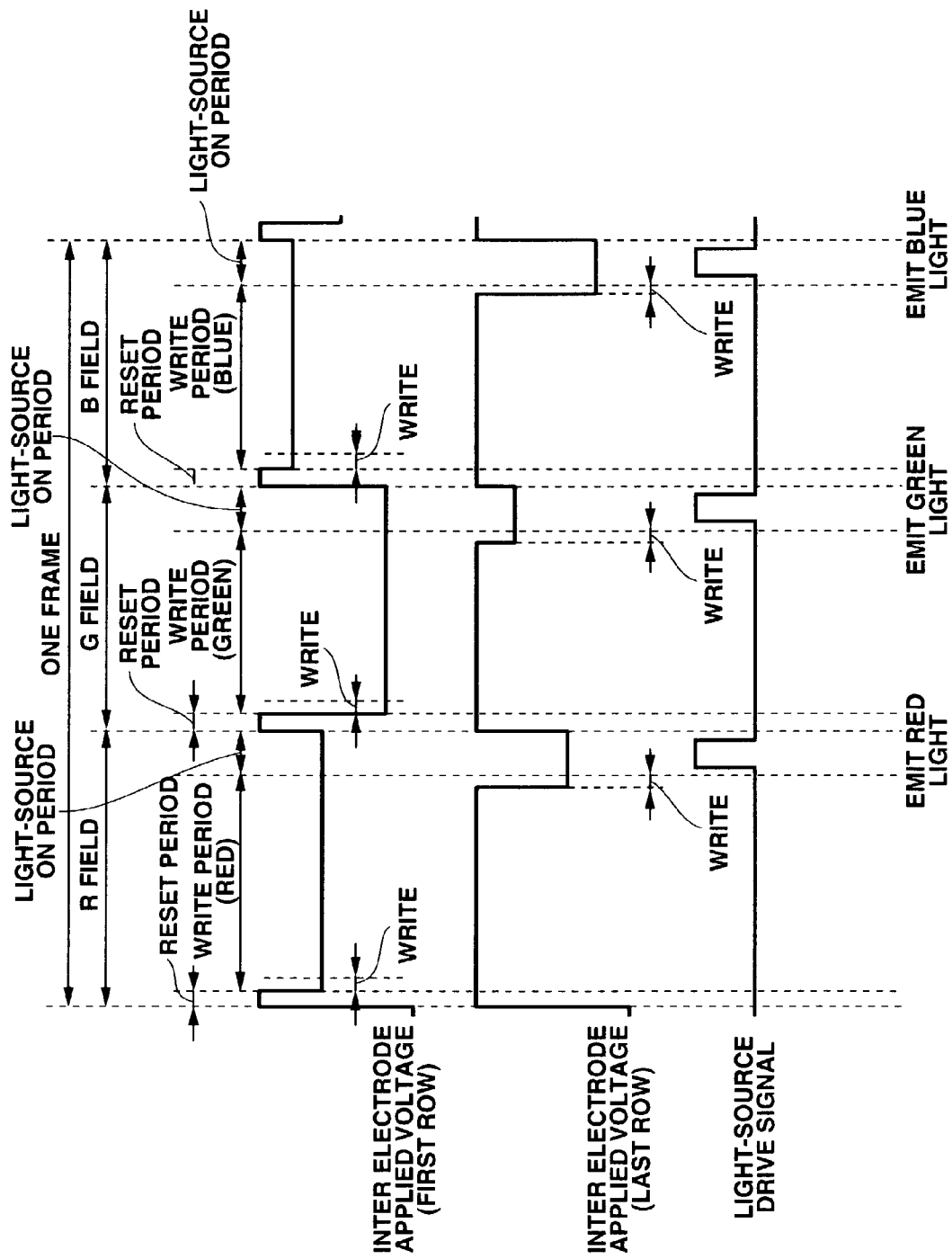
FIG. 7 is a time chart illustrating interelectrode applied voltages for the first row and last row of pixels of the homogeneous alignment type liquid crystal display device and a light-source drive signal in the field sequential type liquid crystal display apparatus according to this embodiment.

The field sequential type liquid crystal display apparatus according to the embodiment is driven by this drive circuit in the manner illustrated in FIG. 7. FIG. 7 illustrates a drive method in the case of driving the liquid crystal display apparatus based on the collective resetting and is a waveform diagram showing interelectrode applied voltages for the first row and last row of pixels of the homogeneous alignment type liquid crystal display device 10 and a light-source drive signal to turn on the individual light sources 42r, 42g and 42b of the illumination device 40. In this embodiment, each of the R field, G field and B field for sequentially displaying images of individual colors of red, green and blue in one frame to display a single color image consists of a reset period to collectively reset the written states of each row of pixels of the liquid crystal display device 10 in the initial stage, a write period to sequentially write image data corresponding to one of the red, green and blue colors into each row of pixels of the liquid crystal display device after the reset period of each field and a light-source ON period for outputting light of the color that corresponds to the image data from the illumination device 40 at the end of each field.

In this embodiment, the illumination device 40 is activated after passage of a time for the liquid crystal molecules of the last row of pixels selected in the write period to be aligned according to the data voltage applied between the pixel electrodes 12 and the opposite electrode 22, and is deactivated immediately before the reset period of the next field.

Specifically, the drive method according to the embodiment first resets the written states of all the rows of pixels of the liquid crystal display device 10 at a time by applying the reset voltage (which has the same value as the highest data voltage V1 in the data voltages V1 to V9 for nine gradations) between the pixel electrodes 12 of all the rows of pixels and the opposite electrode 22 for each of the R, G and B fields for sequentially displaying images of the individual colors of red, green and blue, performs writing to each row of pixels in the subsequent write period by sequentially applying a data voltage (one of the data voltages V1 to V9 for nine gradations) according to the image data of one of the red, green and blue colors between the pixel electrodes 12 of each row of pixels and the opposite electrode 22, and then outputs light of the color that corresponds to the image data from the illumination device 40. The drive method sequentially displays images of monochromatic colors of red, green and blue for each field and displays a full color image which is those monochromatic images combined.

According to the drive method, the selection period for each row of pixels of the liquid crystal display device 10 has only to be set equal to or greater than the longest response time in the response times to data voltages which are applied after the application of the reset voltage, the collective reset period equal to or greater than the longest response time to the reset voltage has only to be provided in addition to the selection period for each row of pixels, and the response time to the data voltage which is applied after the application of the reset voltage is considerably shorter than the response time to the data voltage which is applied without applying the reset voltage. This shortens both the time needed for each field and the period of one field, so that the field sequential type liquid crystal display apparatus which is driven at a high frame frequency can be driven without flickering and can display a moving picture.

Although the reset period is secured in the initial stage of each field in the embodiment, the reset period may be secured after the light-source ON period of each field so that the written state in that field should be reset by applying the reset voltage before the write period of the next field.

Although the written states of each row of pixels of the liquid crystal display device 10 are reset at a time in the embodiment, resetting the written states may be carried out for each pixel in each pixel row before the write period or after the light-source ON period.

Although the reset voltage is set to have the same value as the highest data voltage V1 in the data voltages V1 to V9 for nine gradations in the embodiment, the reset voltage may have a value greater or smaller than the value of the highest data voltage V1 as long as the voltage is high enough to align the liquid crystal molecules approximately perpendicular to the surfaces of the substrates.

Figure 8:
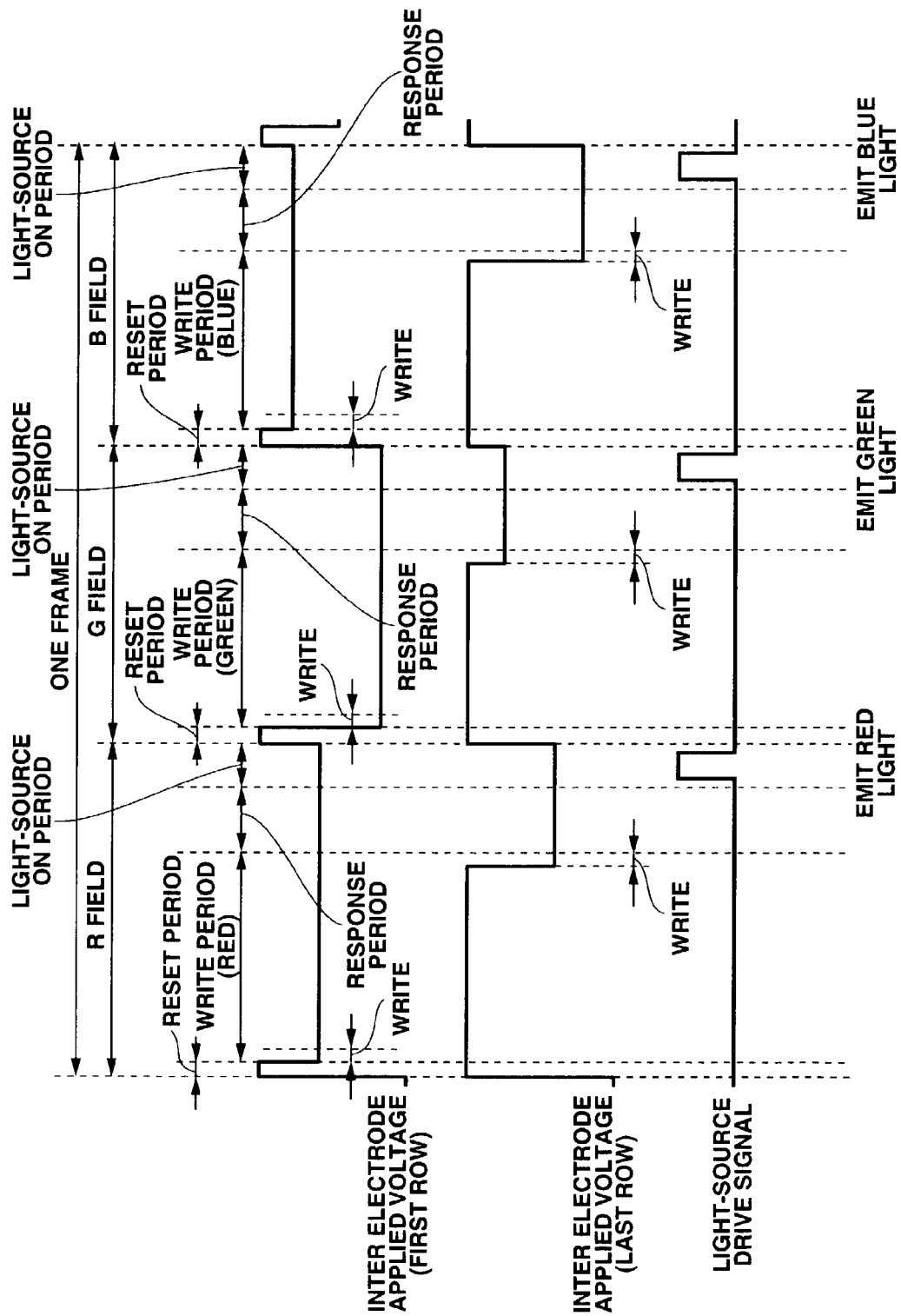
FIG. 8 is a time chart illustrating a modification of the drive method in FIG. 7 for the field sequential type liquid crystal display apparatus according to this embodiment.

Further, in the embodiment, one frame for displaying a single color image is divided into the R field, G field and B field each of which is driven in such a way that voltages are applied between the pixel electrodes 12 and the opposite electrode 22 in each of the reset period, the write period and the light-source ON period. The driving of the liquid crystal display apparatus is not however limited to this particular method, but a response period may be provided after the write period and the light-source ON period may be provided after the response period in each of the R, G and B fields, as shown in FIG. 8. That is, each field is driven separately in the reset period, the write period, the response period and the light-source ON period. First, the reset voltage to align the liquid crystal molecules substantially perpendicular to the surfaces of the substrates is applied between the pixel electrodes 12 of the individual pixels and the opposite electrode 22 at a time in the reset period, voltages corresponding to data of individual monochromatic colors in the color image data are written in all the pixel electrodes in the subsequent write period by sequentially scanning the pixel electrodes 12, the liquid crystal display apparatus stands by in the subsequent response period for the liquid crystal molecules to respond according to the voltage to be applied between the individual pixel electrodes 12 and the opposite electrode 22, and the light source corresponding to the display color of the illumination device 40 is turned on to illuminate the liquid crystal display device 10 in the light-source ON period after the behavior of the liquid crystal molecules is stabilized.

With the response period provided after the write period in each field, the illumination device 40 emits illumination light after waiting for the liquid crystal molecules of all the pixels of the liquid crystal display device 10 to become the alignment state according to the applied voltage. Of the plural pixels laid out in a matrix form, the first row of pixels that are to be scanned first and the last row of pixels-that are to be scanned last are illuminated with the illumination light from the illumination device 40 after the behaviors of their liquid crystal molecules are completed. This eliminates uneven brightness.

The drive method of the invention can be adapted not only to a field sequential type liquid crystal display apparatus equipped with a homogeneous alignment type liquid crystal display device but also to other liquid crystal display apparatuses that have a homogeneous alignment type liquid crystal display device.

What is claimed is:

1. A liquid crystal display apparatus comprising:
    a liquid crystal display device including: (i) a pair of substrates arranged to face each other, (ii) opposing electrodes including at least one electrode on each of opposing surfaces of said pair of substrates, and (iii) a homogeneously aligned liquid crystal layer which is provided between said opposing electrodes and which has liquid crystal molecules having long axes that are aligned without being twisted when an electric field is not applied between said opposing electrodes; and a drive device which applies a voltage corresponding to image data between said opposing electrodes, after applying a reset voltage for causing said liquid crystal molecules to be in a predetermined alignment state between said opposing electrodes;

wherein said image data comprises one of a plurality of pieces of data representing voltages corresponding to a plurality of gradations, and said drive device comprises a control device which applies, as said reset voltage, a highest voltage of the voltages corresponding to said plurality of gradations.

2. The liquid crystal display apparatus according to claim 1, wherein said liquid crystal display device comprises a normally white type liquid crystal display device which includes a pair of polarizers, which transmits light when a voltage is not applied between said opposing electrodes, and which has a transmittance that drops when a voltage is applied between said opposing electrodes, and wherein said reset voltage causes said liquid crystal display device to transmit substantially no light.

3. The liquid crystal display apparatus according to claim 2, wherein said liquid crystal display device includes at least one retardation plate which is provided between said pair polarizers and which adjusts a value of retardation of light that passes through said liquid crystal display device to improve a contrast and a viewing angle characteristic of said liquid crystal display apparatus.

4. The liquid crystal display apparatus according to claim 2, wherein said liquid crystal display device comprises an active matrix liquid crystal display device, wherein said opposing electrodes comprise a plurality of pixel electrodes laid out in a matrix form on a first one of said opposing surfaces of said substrates and at least one opposite electrode on a second of said opposing surfaces, and wherein active elements respectively connected to said plurality of pixel electrodes, gate lines for controlling said active elements, and data lines for supplying data signals corresponding to said image data to said pixel electrodes via the respective active elements, are formed on said first opposing surface.

5. A liquid crystal display apparatus comprising:

a liquid crystal display device including: (i) a first substrate having thereon a plurality of pixel electrodes laid out in a matrix form, active elements respectively connected to said plurality of pixel electrodes, gate lines for controlling said active elements, and data lines for supplying data signals corresponding to image data to said pixel electrodes via the respective active elements, (ii) a second substrate which has thereon at least one opposite electrode, and which is arranged to face said first substrate such that said plurality of pixel electrodes face said opposite electrode, and (iii) a homogeneously aligned liquid crystal layer which is provided between said pixel electrodes and said opposite electrode, and which has liquid crystal molecules having long axes that are aligned without being twisted when an electric field is not applied between said electrodes;

a drive device which applies a reset voltage for aligning said liquid crystal molecules substantially perpendicular to said substrates, which then applies a voltage corresponding to image data of a respective monochromatic image of a respective color of a plurality of monochromatic images constituting a color image to be displayed, and the drive device causes said liquid crystal display device to sequentially display the plurality of monochromatic images; and an illumination device including a light source, which sequentially emits monochromatic light in a plurality of colors in accordance with the colors of the monochromatic imaces to be displayed by said liquid crystal display device driven by said drive device, to irradiate said light onto said liquid crystal display device.

6. The liquid crystal display apparatus according to claim 5, wherein said image data comprises one of a plurality of pieces of data representing voltages corresponding to a plurality of gradations, and said drive device comprises a control device which applies, as said reset voltane, a highest voltage of the voltages corresponding to the plurality of gradations.

7. The liquid crystal display apparatus according to claim 5, wherein said drive device comprises a control device which simultaneously applies said reset voltage to all of said pixel electrodes of said liquid crystal display device, and then sequentially applies the voltage corresponding to the image data of said respective monochromatic image to said pixel electrodes one section at a time.

8. The liquid crystal display apparatus according to claim 5, wherein said illumination device comprises a control device which causes the seqentially emitted light to be emitted such that a light of the respective color of the respective monochromatic image is emitted after passage of a predetermined response time of said liquid crystal molecules, after said drive device has applied the voltage corresponding to said respective monochromatic image, and to be emitted before application of said reset voltage.

9. The liquid crystal display apparatus according to claim 5, wherein said liquid crystal display device comprises a normally white type liquid crystal display device which includes a pair of polarizers, which transmits light when a voltage is not applied between said opposing electrodes, and which has a transmittance that drops when a voltage is applied between said opposing electrodes, and wherein said drive device comprises a control device which applies said reset voltage, and said reset voltage causes said liquid crystal display device to transmit substantially no light.

10. The liquid crystal display apparatus according to claim 9, wherein said illumination device comprises a control device which causes the sequentially emitted light to be emitted such that a light of the respective color of the respective monochromatic image is emitted after passage of a predetermined response time of said liquid crystal molecules, after said drive device has applied the voltage corresponding to said respective monochromatic image, and to be emitted before application of said reset voltage.

11. A method of driving a liquid crystal display apparatus comprising a liquid crystal display device including: (i) a pair of substrates arranged to face each other, (ii) opposing electrodes including at least one electrode on each of opposing surfaces of said pair of substrates, and (iii) a homogeneously aligned liquid crystal layer which is provided between said opposing electrodes and which has liquid crystal molecules having long axes that are aligned without being twisted when an electric field is not applied between said opposing electrodes, and a drive device which drives said liquid crystal display device, said method comprising:

applying, via said drive device, a voltage corresponding to image data between said opposing electrodes after applying a reset voltage for causing said liquid crystal molecules to be in a predetermined alignment state between said opposing electrodes;

wherein said image data comprises one of a plurality of pieces of data representing voltages corresponding to a plurality of gradations, and said reset voltage is a highest voltcae of the voltages corresponding to said plurality of gradations.

12. The method according to claim 11, wherein said liquid crystal display device comprises a normally white type liquid crystal display device which includes a pair of polarizers, which transmits light when a voltage is not applied between said opposing electrodes, and which has a transmittance that drops when a voltage is applied between said opposing electrodes, and wherein said reset voltage causes said liquid crystal display device to transmit substantially no light.

13. The method according to claim 11, wherein said liquid crystal display apparatus further comprises an illumination device which selectively and sequentially emits monochromatic light in a plurality of colors to form a color image to be displayed, wherein said reset voltage causes said liquid crystal molecules to align to be substantially perpendicular to said substrates, said voltage corresponding to said image data corresponds to image data of a monochromatic image of a respective color of said plurality of monochromatic images constituting a color image to be displayed, and said drive device causes said liquid crystal display device to sequentially display said plurality of monochromatic images, and wherein said sequentially emitted monochromatic light in the plurality of colors is emitted by said illumination device in accordance with the colors of the monochromatic images to be displayed by said liquid crystal display device to irradiate said light onto said liquid crystal display device.

14. The method according to claim 13, wherein said liquid crystal display device comprises a normally white type liquid crystal display device which includes a pair of polarizers, which transmits light when a voltage is not applied between said opposing electrodes, and which has a transmittance that drops when a voltage is applied between said opposing electrodes, and wherein said reset voltage which causes said liquid crystal display device to transmit substantially no light.

15. The method according to claim 13, wherein said reset voltage is simultaneously applied to all pixel electrodes of said liquid crystal display device, and then the voltage corresponding to the image data of said respective monochromatic image is sequentially applied to said pixel electrodes one section at a time.

16. The method according to claim 13, wherein said illumination device comprises a control device which causes the sequentially emitted light to be emitted such that a light of the respective color of the respective monochromatic image is emitted after passage of a predetermined response time of said liquid crystal molecules, after said drive device has applied the voltage corresponding to said respective monochromatic image, and to be emitted before application of said reset voltage.

* * * * *